US008488233B2

(12) United States Patent
Huang et al.

(10) Patent No.: US 8,488,233 B2
(45) Date of Patent: Jul. 16, 2013

(54) METHOD AND APPARATUS FOR ENHANCING SIGNAL-TO-NOISE POWER RATIO IN OPTICAL FIBER AMPLIFIERS

(75) Inventors: Bichang Huang, Shenzhen (CN); Aihua Yu, Shenzhen (CN)

(73) Assignee: O-Net Communications (Shenzhen) Limited, Shenzhen (CN)

(*) Notice: Subject to any disclaimer, the term of this patent is extended or adjusted under 35 U.S.C. 154(b) by 815 days.

(21) Appl. No.: 12/571,546

(22) Filed: Oct. 1, 2009

(65) Prior Publication Data

US 2010/0091356 A1   Apr. 15, 2010

(30) Foreign Application Priority Data

Oct. 9, 2008   (CN) .......................... 2008 1 0216688

(51) Int. Cl.
*H04B 10/17* (2006.01)
*H04B 10/12* (2006.01)

(52) U.S. Cl.
USPC ...................................... 359/337.21

(58) Field of Classification Search
USPC ........................................ 359/337.2, 337.21
See application file for complete search history.

(56) References Cited

U.S. PATENT DOCUMENTS

| | | | | |
|---|---|---|---|---|
| 5,521,751 A * | 5/1996 | Aida et al. | ..................... | 359/337 |
| 5,790,301 A * | 8/1998 | Maeda et al. | ................. | 359/337 |
| 5,986,800 A * | 11/1999 | Kosaka | .................... | 359/341.41 |
| 6,008,934 A * | 12/1999 | Fatehi et al. | ............. | 359/341.33 |
| 6,034,800 A * | 3/2000 | Asahi | ................. | 398/1 |
| 6,069,731 A * | 5/2000 | Bayart | ..................... | 359/341.41 |
| 6,671,085 B2 * | 12/2003 | So et al. | .................... | 359/341.42 |
| 6,980,355 B2 * | 12/2005 | Bhowmik et al. | ......... | 359/337.21 |
| 2001/0050807 A1 * | 12/2001 | Deguchi et al. | .......... | 359/341.44 |
| 2006/0221436 A1 * | 10/2006 | Benz et al. | ................ | 359/337.2 |
| 2008/0231943 A1 * | 9/2008 | Sorin et al. | .................... | 359/336 |

FOREIGN PATENT DOCUMENTS

JP    2005070570 A   *   3/2005

* cited by examiner

*Primary Examiner* — Eric Bolda

(57) ABSTRACT

The invention discloses an apparatus for enhancing the signal power to ASE power ratio in an optical amplifier including a 1×n input optical switching component, n band-pass filters, and an n×1 output optical switching component, wherein the signal power is allowed to pass through the band-pass filter switched by the 1×n input optical switching component and the n×1 output optical switching component.

8 Claims, 3 Drawing Sheets

METHOD AND APPARATUS FOR ENHANCING SIGNAL-TO-NOISE POWER RATIO IN OPTICAL FIBER AMPLIFIERS

BACKGROUND OF THE INVENTION

1. Field of the Invention

This invention relates to optical fiber amplifiers, especially to a method and an apparatus for enhancing optical signal power to amplified spontaneous emission (ASE) power ratio in optical fiber amplifiers.

2. Background

In high bit-rate optical fiber transmission systems (channel rate >40 Gb/s), it is often required to use EDFA to amplify the individual channels power to compensate for large insertion loss in optical transponders. One of the important performance requirements is the signal power to total ASE noise power ratio (Ps/ASE) in such applications. Although the EDFA is used for single channel operation in this case, it has to provide optical gain over entire C-Band or L-band as the optical channel can be located at any ITU grid. As a result, the total ASE power over entire C-band or L-band can be quite significant compared with the amplified optical signal power. If the signal to ASE ratio is small, the optical receiver may be saturated, and the receiver's signal to noise ratio (SNR) can be degraded due to the spontaneous-to-spontaneous beat noise caused by large total ASE power from the EDFA. Taking a conventional C-band single channel EDFA as an example, the ASE bandwidth of the EDFA can be from 1528 nm to 1562 nm, total ASE can be comparable to the amplified signal power, i.e., the signal to ASE power ratio can be as low as 0 dB. This can cause significant bit error rate (BER) performance degradation in the receivers. Therefore, a means for enhancing Ps/ASE ratio becomes a necessity. In theory, one could use a tunable band pass filter for this purpose. However, tunable filter is generally very expensive and therefore it is cost effective. In this invention, a low cost solution that uses switchable band-pass filters in EDFA is disclosed.

SUMMARY OF THE INVENTION

The objectives of the present invention are to provide a method and an apparatus for enhancing optical signal power to amplified spontaneous emission (ASE) power ratio in optical fiber amplifiers.

In order to achieve the objectives of the present invention, the present invention provides an apparatus for enhancing the signal power to ASE power ratio in an optical amplifier including a 1×n input optical switching component, n band-pass filters, and an n×1 output optical switching component, wherein the signal power is allowed to pass through the band-pass filter switched by the 1×n input optical switching component and the n×1 output optical switching component.

In some embodiments, the ASE power is rejected while the signal power is allowed. The 1×n input switch, the n band-pass filters and the n×1 output switch/coupler are connected in series. The 1×n input optical switching component is a switch. The n×1 output optical switching component is a switch or a coupler. When n=2, it comprises one 1×2 optical switch, two band-pass filters and one 2×1 optical switch that are connected in series; when n>2, it comprises one 1×n optical switch, n BPFs and one n×1 optical switch that are connected in series. The apparatus is arranged either at the output of the optical amplifier, in the intermediate stage of the optical amplifier or between two independent optical amplifiers. The apparatus further includes a wavelength detector at the input of the optical amplifier for identifying the sub-band that the incoming optical signal belongs. The apparatus further includes a series of three-port wavelength division multiplexers to divide incoming signal into a group of sub-bands and then to detect the optical power at each sub-band by photo detectors, wherein each sub-band matches the corresponding BPF in terms of center wavelength and bandwidth.

The invention further provides a method for enhancing the single power to ASE power ratio in an optical amplifier, which includes determining the sub-band of the incoming signal belongs and selecting the signal wavelength or the sub-band. The method further includes rejecting ASE power while the signal power is selected. The method further includes dividing incoming signal into a group of sub-bands.

DETAILED DESCRIPTION OF THE INVENTION

Referring to the figures, the following gives a description about a method and an apparatus for enhancing signal-to-noise power ratio in optical amplifiers in accordance with the present invention.

Figure 1:
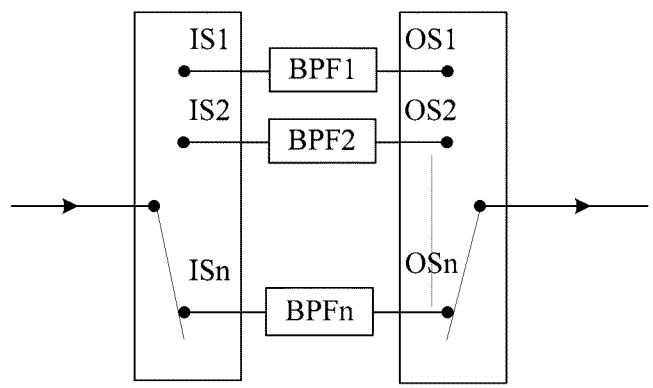
FIG. 1 is a schematic diagram of an apparatus that can be inserted between EDFA stages or output end for enhancing the signal power/ASE power ratio in an optical amplifier (OA), which includes 1×n input optical switches (IS), a plurality of band-pass filters (BPF) and an n×1 output optical switch (OS)
Figure 2:
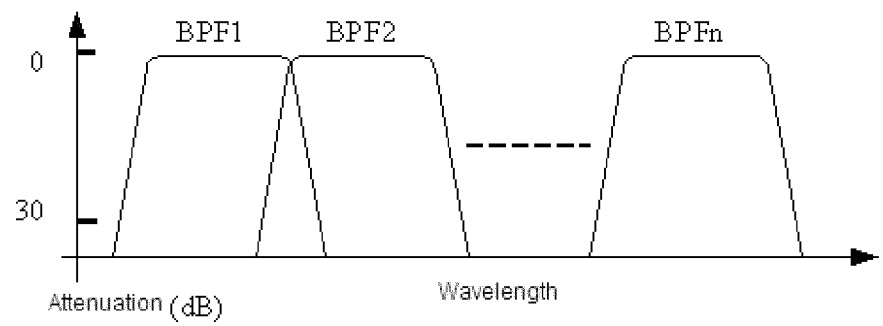
FIG. 2 shows the transmission spectrum of the apparatus as shown in FIG. 1.

FIG. 1 shows the configuration of the apparatus with multiple band-pass filters in one embodiment of the present invention. As shown in FIG. 1, the apparatus comprises three parts: a 1×n input switch IS, n band-pass filters BPF and an n×1 output switch/coupler OS. The 1×n input switch IS, the n band-pass filters BPF and the n×1 output switch/coupler OS are connected in series. Thereafter, such an apparatus comprising an input optical switch, band-pass filters, and an output optical switch/coupler is refereed to as switchable band-pass filter SBPF. The transmission characteristics of each BPF are illustrated in FIG. 2. From FIG. 2, we can see that the entire operating wavelength range is divided into n sub-band with each sub-band covering a particular range of signal wavelength channels. Each BPF will have a different center wavelength. A small overlap of the pass-band for the adjacent BPFs can be applied to allow small wavelength drift. For a given operating channel wavelength, a particular BPF will be used accordingly by selecting the corresponding input and output switch ports. The selected band-pass filter will allow the signal channel to pass while blocking the ASE power outside the pass band of the selected filter. The pass-band of the BPF will be approximately equal to total operating wavelength range divided by number of BPFs plus a small guard band (1 nm, for example) to allow small overlap. The enhancement of the signal to ASE noise ratio will be dependent on the number of BPFs used. For a given overall operating channel wavelength range, more BPFs will make it possible to reduce the bandwidth of the BPF. As an approximation, the improvement of the signal to ASE ratio is slightly below 10*log 10(number of BPFs) in dB. For example, if two BPFs are used, then the improvement will be close to 3 dB. The number of filters to be used can be determined by the requirement of signal to ASE ratio enhancement. This is dependent on signal to ASE ratio requirement, input signal power, EDFA gain. The channel number n can be predetermined according to the demand for the optical amplifier. This is often a trade between performance and cost.

Figure 3:
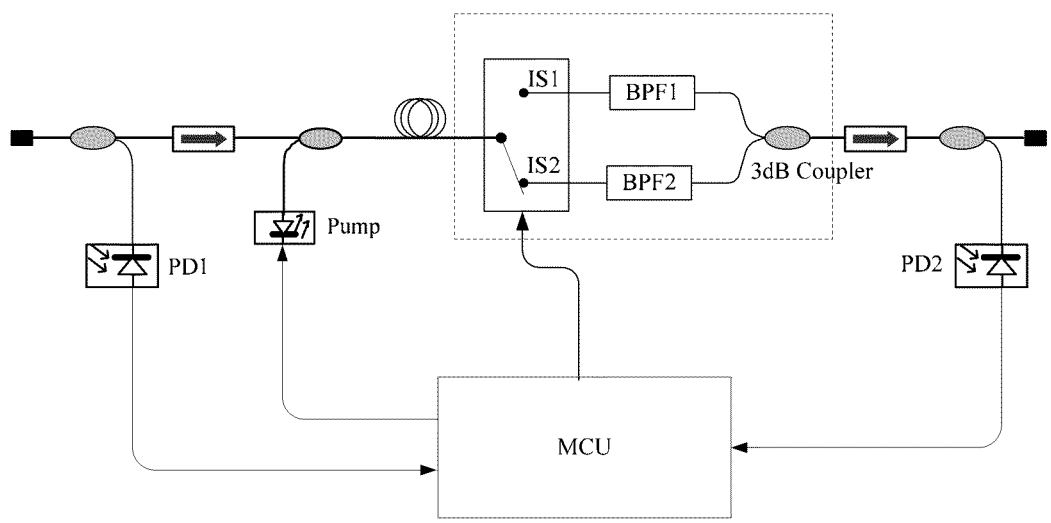
FIG. 3 shows the optical amplifier with the apparatus as shown in FIG. 1 inserted therein.

FIG. 3 shows optical amplifier schematics with inserted SBPF, an apparatus in this invention that enhances the signal power/ASE noise power ratio in the amplifier. It illustrates an example of the optical amplifier configuration with a SBPF of two BPFs inserted at the output end of the amplifier. The SBPF apparatus comprises the first input optical channel switching component IS1, the second output optical channel switching component IS2, the first band-pass filter BPF1, and the second band-pass filter BPF2. In this simple configuration, the enhancement of the signal to ASE power ratio is about 3 dB, which would be sufficient for most systems. Optical switch port will be selected according to operating signal wavelength.

This invention further discloses a method that enhances the signal to ASE power ratio, whose operating principle can be described as follows by refereeing to FIG. 3.

This embodiment takes the Er-doped fiber amplifier (EDFA) with inserted SBPF with two BPFs as the example. The EDFA has wide amplification bandwidth can be tailored to cover either C or L-band. Generally an EDFA can provide amplification over more than 30 nm optical wavelength range. But it also generates wide band ASE power while providing gain at the signal wavelength. As a result, the signal to ASE ratio can be very small after amplification. In this invention, the inserted BPF will allow help to filter out most of the unwanted ASE power outside the signal channel wavelength by selecting corresponding input and output switch ports according to the signal channel center wavelength. The selected band-pass filter will allow signal power to pass while rejecting the wide band ASE power outside the pass band of the selected BPF. The enhancement of the signal to ASE ratio is close to 10*log 10(number of BPFs) in dB.

Figure 4A:
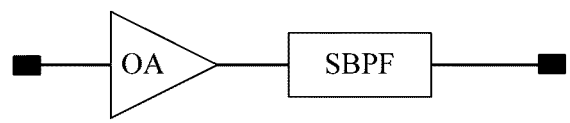
FIG. 4a shows that the apparatus (SBPF) as shown in FIG. 1 is arranged at the output of the optical amplifier.
Figure 4B:
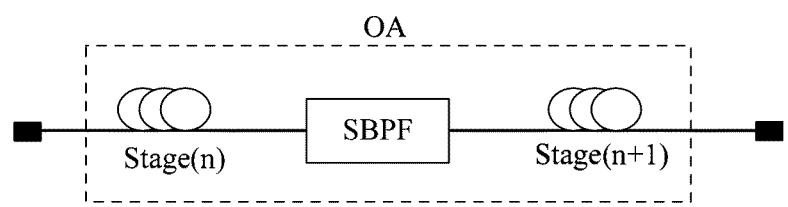
FIG. 4b shows that the apparatus (SBPF) as shown in FIG. 1 is arranged at the intermediate stage of the amplifier.
Figure 4C:
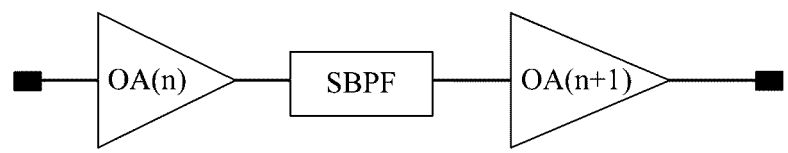
FIG. 4c shows that the apparatus (SBPF) as shown in FIG. 1 is arranged between two independent amplifiers.

FIG. 4a to FIG. 4c illustrates three possible variations of the present invention. FIG. 4a shows the SBPF is inserted at the end of an amplifier. This arrangement is most effective in terms of the signal to ASE ratio enhancement. A drawback for this configuration is that it reduces the output power of the optical amplifier due to its insertion loss. To solve this problem, one could insert the SBPF between the amplifier stages as shown in FIG. 4b. The degradation of the noise figure (NF) due to insertion loss is minimal if the $1^{st}$ stage gain of the amplifier is relatively large. This configuration will be particularly cost effective for use of SBPF with n×1 couplers replacing switch as shown in FIG. 1. In a commonly used two stage optical amplifier configuration, one could insert the SBPF with 2×1 coupler in the middle stage without much impact to the output power and noise figure (NF) while obtaining close to 3 dB signal to ASE ratio enhancement. Another possible variation is to insert the SBPF between two independent optical amplifiers as shown in FIG. 4c.

Figure 5:
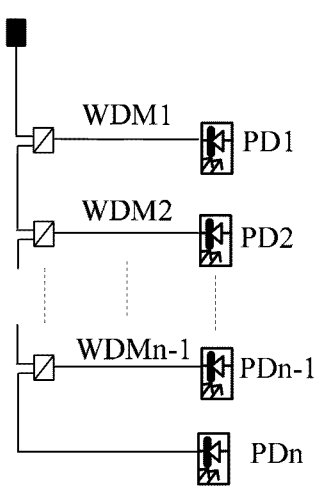
FIG. 5 is a schematic diagram of a wavelength detector (WD) for the apparatus.

One enhancement of the present invention is to insert an optical apparatus shown in FIG. 5 at the input of the optical amplifier to allow automatic signal wavelength detection (WD). It comprises n−1 WDM filters to allow optical power detection within each sub-band of the SBPF. The WDM filters identify the sub-band that the incoming optical signal belongs. By detection of signal power at different sub-band, the center wavelength range of the input optical signal can be determined. This center wavelength information can be used to select the switch port of the SBPF. If the center wavelength can be fed to the amplifier externally, then the wavelength detection (WD) apparatus will become unnecessary.

Figure 6:
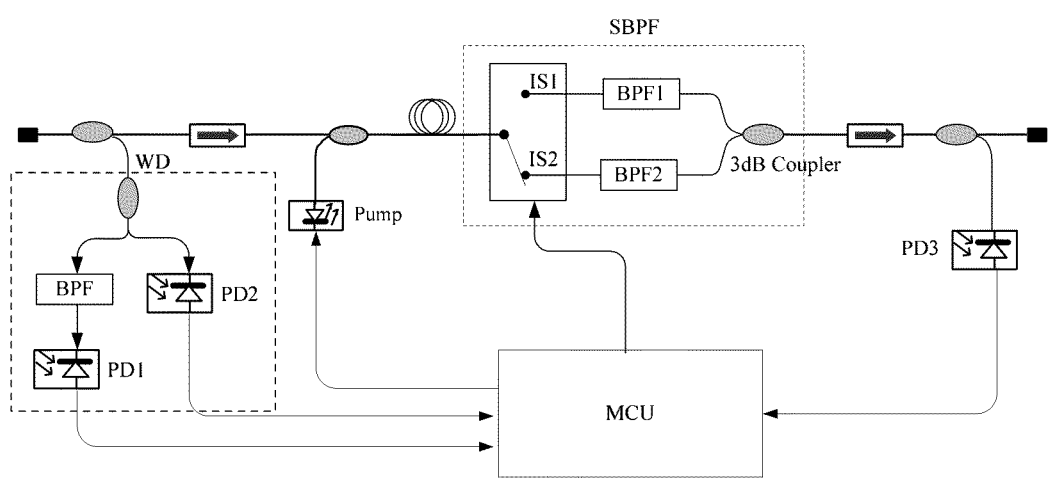
FIG. 6 is a schematic diagram of an apparatus in another embodiment of the invention with a wavelength detector (WD) in an optical amplifier.

FIG. 6 shows a two stage optical amplifier with inserted SBPF and WD as described in the present invention. This represents a possible simple optical configuration using the present invention to enhance the signal to ASE ratio with automatic wavelength detection. At the input of optical amplifier, the WD will be able to determine within which sub-band the input signal is. Then the amplifier can set the corresponding switch port.

According to another embodiment of the present invention, the apparatus further comprises a series of three-port wavelength division multiplexers to divide incoming signal into a group of sub-bands and then to detect the optical power at each sub-band by photo detectors, wherein each sub-band matches the corresponding BPF in terms of center wavelength and bandwidth.

Using the configuration as shown in FIG. 6, the general procedure of the method disclosed to enhance the signal to ASE ratio is as follows:

First, determine the sub-band of the incoming signal belongs with the wavelength detection apparatus at the input. The signal wavelength information is available external, this step can be skipped. Second, select the switch ports according to the signal wavelength or the sub-band it belongs. If a coupler is used to replace the output switch, then only input switch needs to be set. Then it will allow signal power to pass through the selected BPF while rejecting the ASE power outside the band-pass filter.

This invention discloses a practical apparatus and method that enhances the signal power to ASE noise power ratio in optical amplifiers, EDFAs in particular, whose advantages include:

1. This apparatus SBPF can improve the signal power to ASE noise power ratio and thus effectively avoid the receiver saturation and reduce ASE beat noise in the receiver. For an EDFA using a SBPF with n BPFs, the enhancement of the signal power to ASE noise power ratio is close to 10*log 10(n) in dB. In most of practical situation, n=2 would be sufficient.

2. Compared with alternative solution such as tunable filter, the SBPF apparatus is low in cost and occupies less space.

3. The SBPF apparatus offers design flexibility in terms of cost and performance trade-off as one can chose the use of number of BPFs based on system performance requirement.

4. In the case when the system cannot provide optical signal wavelength information, the proposed method of the wavelength detection disclosed in present invention can effectively identify the sub-band of the incoming signal belongs so that the amplify can automatically select the wavelength port.

What is claimed is:
1. An apparatus for enhancing the signal power to ASE power ratio in an optical amplifier comprising:
   a 1×n input optical switching component,
   n band-pass filters, and
   an n×1 output optical switching component, wherein the 1×n input optical switching component, the n band-pass filters and the n×1 output optical switching component are connected in series;

wherein the signal power is allowed to pass through the band-pass filter switched by the 1×n input optical switching component and the n×1 output optical switching component;

wherein the ASE power is rejected while the signal power is allowed to pass through.

2. The apparatus for enhancing the single power to ASE power ratio as claimed in claim 1, wherein the 1×n input switch, the n band-pass filters and the n×1 output switch/coupler are connected in series.

3. The apparatus for enhancing the signal power to ASE power ratio as claimed in claim 1, wherein the n×1 output optical switching component is an n×1 optical coupler.

4. The apparatus for enhancing the signal power to ASE power ratio as claimed in claim 1, wherein the n×1 output optical switching component is a switch or a coupler.

5. The apparatus for enhancing the single power to ASE power ratio as claimed in claim 1, wherein when n=2, it comprises one 1×2 optical switch, two band-pass filters and one 2×1 optical switch that are connected in series; when n>2, it comprises one 1×n optical switch, n BPFs and one n×1 optical switch that are connected in series.

6. The apparatus for enhancing the single power to ASE power ratio as claimed in claim 1, wherein the apparatus is arranged at the output of the optical amplifier.

7. The apparatus for enhancing the single power to ASE power ratio as claimed in claim 1 further comprising a wavelength detector at the input of the optical amplifier for identifying the sub-band that the incoming optical signal belongs.

8. The apparatus for enhancing the single power to ASE power ratio as claimed in claim 7 further comprising a series of three-port wavelength division multiplexers to divide incoming signal into a group of sub-bands and then to detect the optical power at each sub-band by photo detectors, wherein each sub-band matches the corresponding BPF in terms of center wavelength and bandwidth.

* * * * *